United States Patent
Brown et al.

(10) Patent No.: US 7,004,272 B1
(45) Date of Patent: Feb. 28, 2006

(54) CHILD AND ADULT TRANSPORTING STROLLER SYSTEM

(76) Inventors: Tyrone A. Brown, 27699 E. 21st St., Highland, CA (US) 92346; Yvonne A. Brown, 27699 E. 21st St., Highland, CA (US) 92346

( * ) Notice: Subject to any disclaimer, the term of this patent is extended or adjusted under 35 U.S.C. 154(b) by 168 days.

(21) Appl. No.: 10/441,310

(22) Filed: May 19, 2003

(51) Int. Cl.
*B60K 1/00* (2006.01)

(52) U.S. Cl. .................. 180/65.1; 280/304.1; 280/32.7

(58) Field of Classification Search ............... 180/166, 180/11, 180, 181, 216, 221, 342, 65.1, 65.5, 180/65.6, 60, 907, 315; 280/641, 642, 643, 280/647, 649, 650, 648, 654, 47.38, 32.7; 188/20, 31, 69; 192/16, 19, 219, 220, 15
See application file for complete search history.

(56) References Cited

U.S. PATENT DOCUMENTS

| | | | | |
|---|---|---|---|---|
| 1,598,124 A | * | 8/1926 | Evans | 180/342 |
| 3,485,314 A | * | 12/1969 | Herr | 180/19.1 |
| 4,096,920 A | * | 6/1978 | Heyn | 180/11 |
| 4,629,950 A | * | 12/1986 | Ching | 318/285 |
| 4,750,578 A | * | 6/1988 | Brandenfels | 180/13 |
| 5,020,624 A | * | 6/1991 | Nesterick et al. | 180/210 |
| 5,263,730 A | * | 11/1993 | Roach et al. | 280/47.4 |
| 5,388,850 A | * | 2/1995 | Simone | 280/442 |
| 5,622,375 A | | 4/1997 | Fairclough | |
| 5,722,682 A | | 3/1998 | Wang | |
| 5,809,756 A | * | 9/1998 | Scag et al. | 56/10.8 |
| 5,813,679 A | | 9/1998 | Hobrath | |
| 5,842,707 A | * | 12/1998 | Smith | 280/32.7 |
| 5,845,724 A | * | 12/1998 | Barrett | 180/65.1 |
| 5,873,425 A | * | 2/1999 | Yang | 180/65.6 |
| 5,882,022 A | * | 3/1999 | Convertini et al. | 280/47.38 |
| 5,884,922 A | * | 3/1999 | Pickering | 280/7.17 |
| 5,937,961 A | * | 8/1999 | Davidson | 180/166 |
| 5,947,505 A | | 9/1999 | Martin | |
| D431,212 S | | 9/2000 | Haung | |
| 6,148,942 A | * | 11/2000 | Mackert, Sr. | 180/65.6 |
| 6,250,653 B1 | | 6/2001 | Worrell | |
| 6,302,421 B1 | * | 10/2001 | Lee | 280/210 |
| 6,360,836 B1 | * | 3/2002 | Milano et al. | 180/65.6 |
| 6,443,252 B1 | * | 9/2002 | Andes | 180/65.1 |
| 6,585,284 B1 | * | 7/2003 | Sweeney et al. | 280/650 |

* cited by examiner

*Primary Examiner*—J. Allen Shriver

(57) ABSTRACT

A child and adult transporting stroller system is disclosed that provides an adult ride along function. The system includes a frame having a front and a rear and lateral sides, a child supporting seat mounted on the frame, ground engaging structure for engaging a ground surface and supporting the frame on the ground surface, moving structure for rotating the ground engaging structure for moving the frame over the ground surface, and steering structure for steering movement of the frame. The system also includes an auxiliary person support platform assembly mounted on the frame. The auxiliary person support platform assembly includes a platform that is pivotable between a lowered, person supporting position and a raised, stored position.

19 Claims, 5 Drawing Sheets

CHILD AND ADULT TRANSPORTING STROLLER SYSTEM

BACKGROUND OF THE INVENTION

1. Field of the Invention

The present invention relates to child strollers and more particularly pertains to a new child and adult transporting stroller system that assists the user to move the stroller between locations.

2. Description of the Prior Art

The use of child strollers is known in the prior art. Various stroller configurations have been proposed for carrying additional cargo and children on the stroller in addition to the child seated in the stroller. While these proposed stroller configurations can be helpful, they do little or nothing to relieve the burden on the person pushing the stroller laden with the additional cargo and children.

It is believed that there is a need in the art for a stroller that is capable not only of carrying additional cargo and children, but also relieves some of the burden on the person that has to move the stroller from location to location.

SUMMARY OF THE INVENTION

In view of the foregoing disadvantages inherent in the known types of child strollers now present in the prior art, the present invention provides a new child and adult transporting stroller system that assists the user to move the stroller between locations.

To attain this, the present invention discloses a child and adult transporting stroller system that provides an adult ride along function. The system includes a frame having a front and a rear and lateral sides, a child supporting seat mounted on the frame, ground engaging means for engaging a ground surface and supporting the frame on the ground surface, moving means for rotating the ground engaging means for moving the frame over the ground surface, and steering means for steering movement of the frame. The system also includes an auxiliary person support platform assembly mounted on the frame. The auxiliary person support platform assembly includes a platform that is pivotable between a lowered, person supporting position and a raised, stored position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the ability to carry additional children and even cargo on the stroller of the invention, while not placing the entire burden of the added weight of these items on the user trying to move the stroller.

Further advantages of the invention, along with the various features of novelty which characterize the invention, are pointed out particularly in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
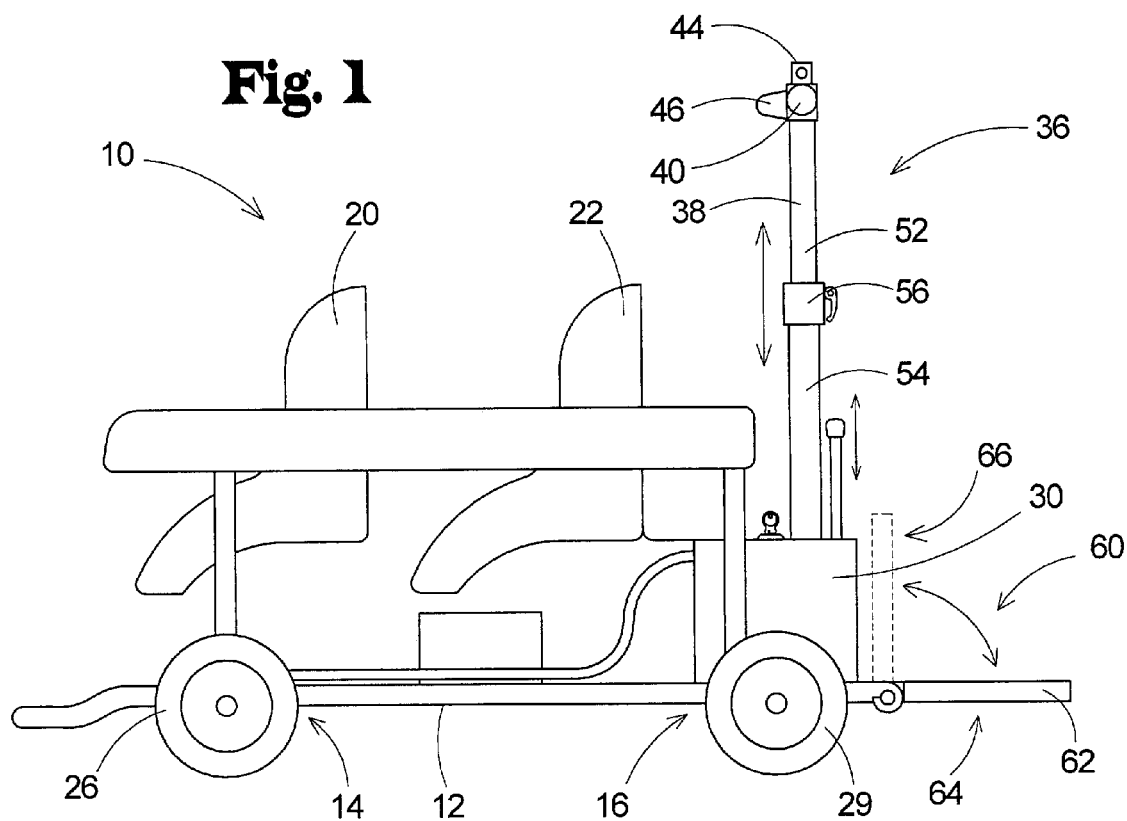
FIG. 1 is a schematic side view of a new child and adult transporting stroller system according to the present invention.
Figure 2:
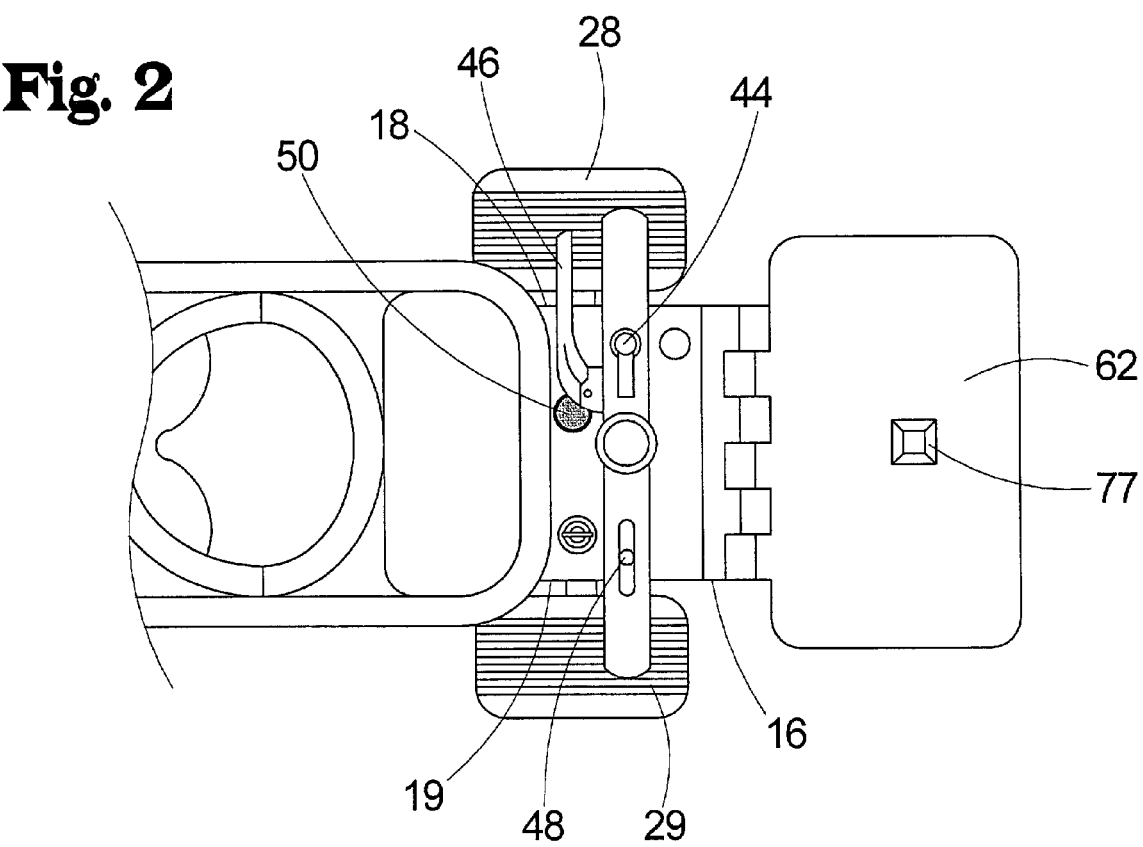
FIG. 2 is a schematic top view of a rear portion of the present invention.
Figure 3:
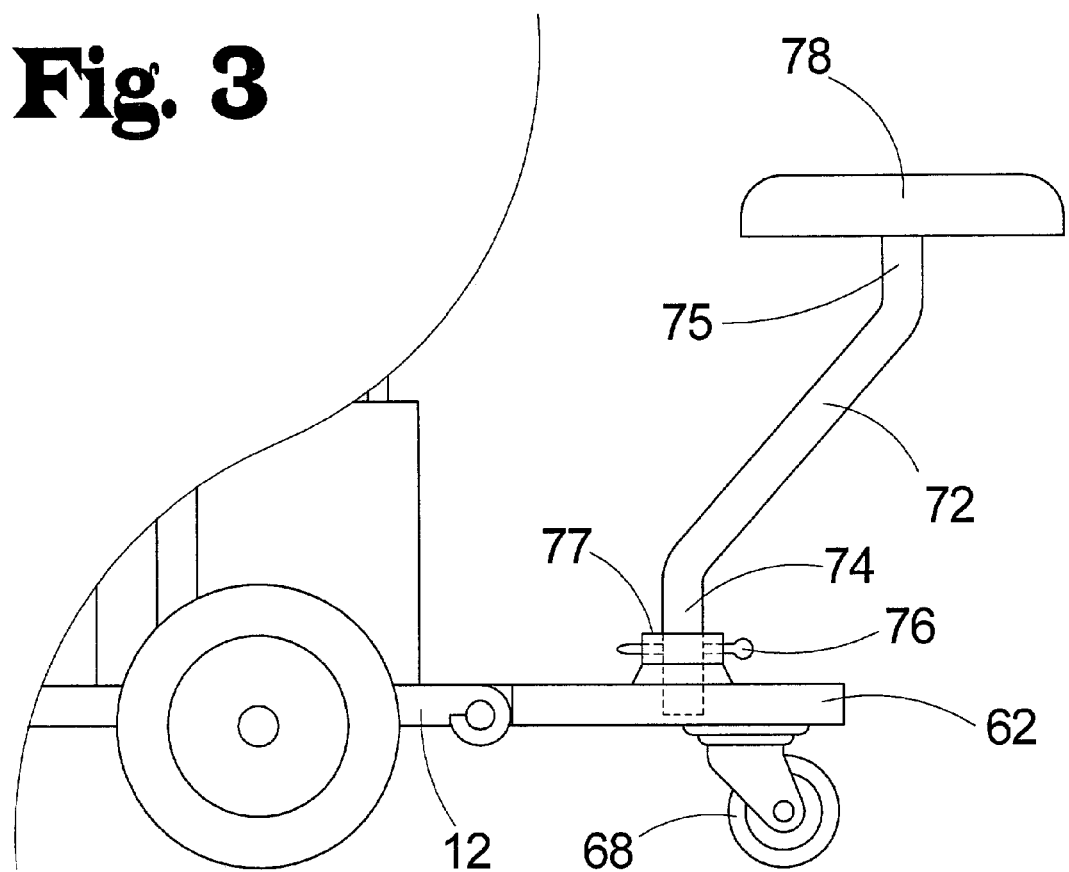
FIG. 3 is a schematic side view of a rear portion of the present invention particularly illustrating a number of optional features that may be included in the present invention.
Figure 4:
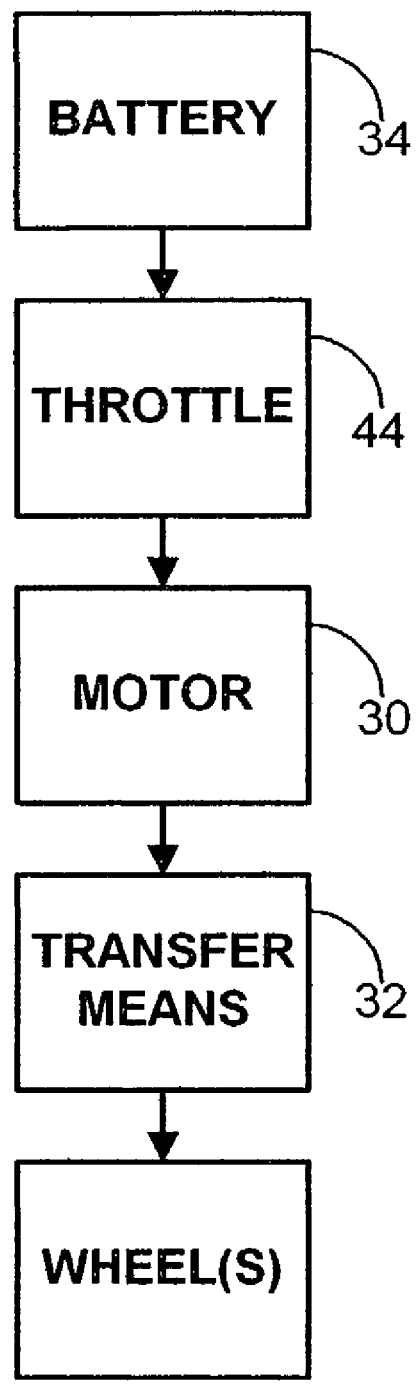
FIG. 4 is a schematic flow diagram of power movement through the present invention.
Figure 5:
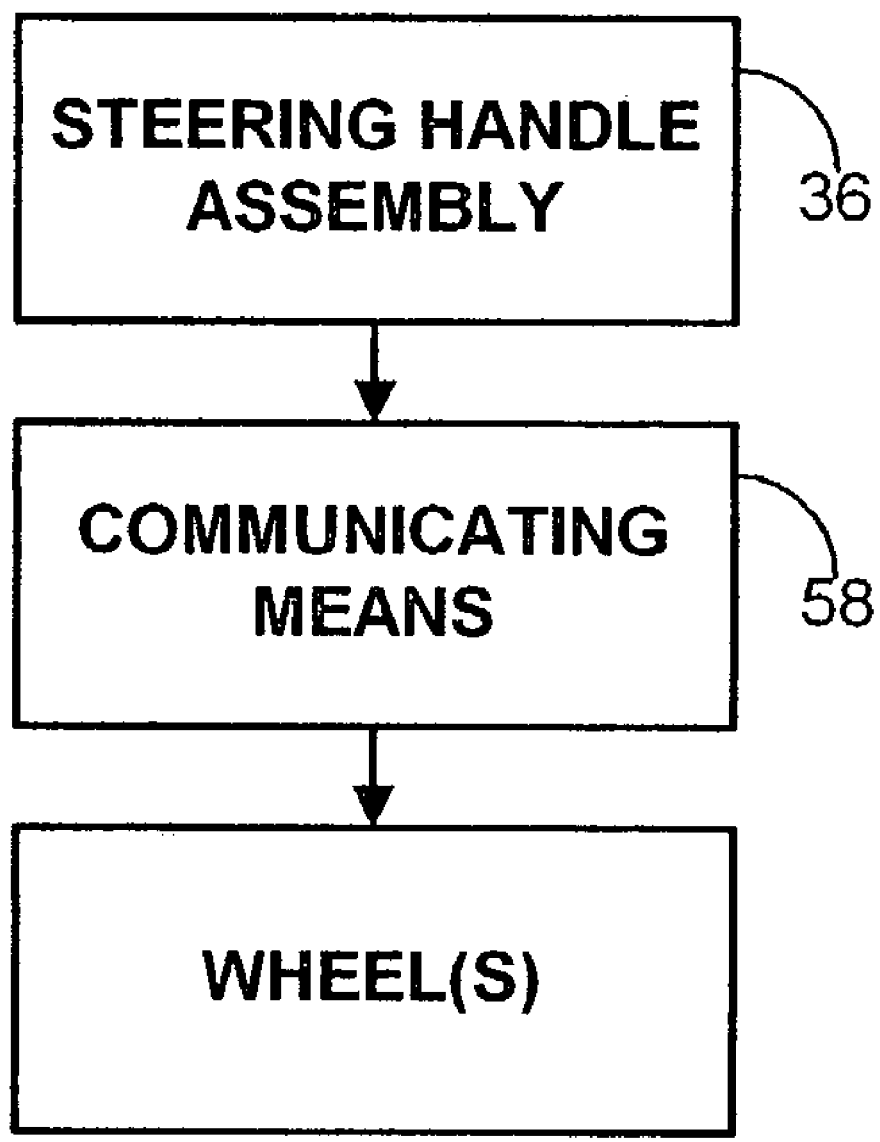
FIG. 5 is a schematic flow diagram of a steering aspect of the present invention.

With reference now to the drawings, and in particular to FIGS. 1 through 5 thereof, a new child and adult transporting stroller system embodying the principles and concepts of the present invention and generally designated by the reference numeral 10 will be described.

The present invention comprises a child and adult transporting stroller system 10 that features an adult ride along function that permits an adult to ride along with the stroller system either in a standing or seated position. In general, the stroller system 10 generally comprises a frame 12 with ground engaging means mounted thereon, a moving means for moving the ground engaging means to move the stroller system, steering means for steering movement of the stroller system, and an auxiliary person support platform assembly mounted on the frame for supporting a person moving with the stroller system.

In particular, the frame 12 of the system 10 has a front 14, a rear 16, and lateral sides 18, 19. The system also includes a child supporting seat 20 mounted on the frame 12, and the seat 20 may be located toward the front 14 of the frame 12. Optionally, a second child supporting seat 22 my be mounted on the frame 12, and as a further option a third child supporting seat (not shown) may also be mounted on the frame 12. Optionally, a cargo box may be positioned on the stroller system 10 at a location, for example, behind the seats 20, 22.

The system 10 may also include ground engaging means for engaging a ground surface 2 and supporting the frame 12 on the ground surface. In one embodiment of the invention, the ground engaging means is embodied as at least one front wheel 26, and preferably a pair of wheels 26, that are mounted on the frame 12 toward the front 14 of the frame, and a pair of rear wheels 28, 29 mounted on the frame 12 toward the rear 16 of the frame. Optionally, in another embodiment of the invention (not shown), a pair of front wheels may be mounted on the frame 12.

The stroller system 10 may include locking means for selectively locking rotation of at least one of the wheels for resisting movement of the frame over the ground surface. Such locking means may take the form of known braking systems that apply pressure to one of the wheels to resist rotation, or a member that mechanically interlocks with a portion of the wheel of a drive train linked to the wheel. Additionally, the stroller system 10 may include braking means for slowing rotation (as opposed to preventing rotation) of one or more of the wheels 26, 28, 29 of the stroller system 10. Optionally, the locking means and the braking means may be integrated together so that these functions are performed by the same structure.

Significantly, the front wheel or wheels 26, or optionally the pair of rear wheels 28, 29, are pivotable about a substantially vertical axis for permitting steering of movement of the frame. In the most preferred embodiments of the invention, the front wheel or wheels 26 are pivotable with respect to the frame 12.

The system also includes moving means for rotating the ground engaging means (such as, for example, the rear wheels 28, 29) for moving the frame over the ground surface. In the illustrative embodiment of the invention, the moving means is embodied by a motor 30 supported on the frame 12 and transfer means 32 supported on the frame for transferring rotation from the motor 30 to at least one of the rear wheels 28, 29 of the ground engaging means. As will be appreciated by those skilled in the art, this transfer of rotation may be accomplished by a combination of shafts and gears linking the motor 30 to the wheels 28, 29. Optionally, the rear wheels 28, 29 may be linked together by a shaft or axle that, when rotated, will in turn rotate each of the wheels 28, 29. The moving means may also include power means supported on the frame 12 for powering the motor 30. In one embodiment of the system 10, the power means comprises a battery 34, and preferably the battery is rechargeable. Illustratively, the battery 34 may be positioned below the seats 20, 22, and may be positioned forward of the rear wheels 28, 29.

The system 10 also includes steering means for steering movement of the frame 12. In one embodiment of the invention, the steering means includes a steering handle assembly 36 that is mounted on the frame 12. The steering handle assembly 36 is rotatable about a substantially vertical axis, and may comprise a steering upright 38 and a steering cross bar 40. The steering upright 38 may be mounted on the frame in a manner that permits rotation with respect to the frame 12 about a longitudinal axis of the steering upright to thereby permit the rotation of the steering handle assembly. The steering cross bar 40 is mounted on the steering upright 38 toward an upper end of the steering upright, and may extend laterally from the steering upright.

The system 10 may also include control means for controlling movement of the stroller frame. The control means may include a throttle 44 that is mounted on the steering cross bar 40 in a location for being gripped and actuated by the hand of the user. The throttle 44 may control the flow of electricity to the motor 30 for controlling the speed of rotation of the motor and thereby controlling the speed of movement of the frame 12 of the stroller system 10 across the ground. The throttle 44 may also be adapted to control the direction of rotation of the motor to thereby control the direction of movement of the frame 12 of the stroller system 10 across the ground.

The control means may also include a brake lever 46 that is mounted on the steering cross bar 40 for being actuated by a hand of the user. The brake lever 46 may be actuated by the user to cause the braking means to be activated for slowing or stopping the rotation of the wheels 28, 29 and movement of the stroller system 10 across the ground. The control means may also include a horn actuator 48 mounted on the steering cross bar 40 for being actuated by a hand of the user, and may be linked to a sound producing device 50 that produces a sound sufficiently loud to gain the attention of others when being approached by the stroller system 10. The sound producing device may comprise a horn, speaker, buzzer, or the like.

The control means may also include means for locking the steering handle assembly 36, and particularly the steering upright 38, against rotation to prevent steering by the steering handle assembly and also unlocking the steering upright for rotation to permit steering by the steering handle assembly. In one embodiment of the invention, depression of the steering handle assembly 36 into a depressed position toward the frame 12 locks the steering upright 38 against rotation and preventing steering of the steering handle assembly, and extension of the steering handle assembly from the depressed position into an extended position unlocks the steering upright to permit rotation of the steering handle assembly. One skilled in the art will recognize that there are a number of ways in which to achieve the locking and unlocking of the steering handle assembly, including, but not limited to, selectively interlockable splines formed on the steering upright 38 and a yoke on the frame into which the steering upright is inserted.

Optionally, a length of the steering upright 38 may be adjustable such that a height of the steering cross member 40 above the frame 12 is adjustable. The adjustable nature of the steering upright 38 may be effected by any suitable means. In one embodiment of the invention, the steering upright 38 may comprise an upper portion 52 and a lower portion 54 that are telescopically mounted together, with suitable means for securing the relative extended position of one of the portions with respect to the other portion, such as, for example, a contraction collar 56 contracts or constricts one of the portions onto the other of the portions.

The stroller system 10 may also include communicating means 58 for communicating steering movement of the steering handle assembly 36 to the front wheel 26. Those skilled in the art will recognize a number of ways of communicating or transferring the steering movement of the steering handle assembly 36 to the front wheel 26. The communicating means 58 may comprise any suitable structure for communicating rotation, including, but not limited to, shafts, gears, cables, and the like. In the illustrative embodiment, a bi-directional cable (see FIG. 1) extends between the steering handle assembly and the front wheel or wheels to control pivot or swivel movement of the front wheel or wheels.

A significant feature of the stroller system 10 of the invention comprises an auxiliary person support platform assembly 60. The auxiliary person support platform assembly 60 may be mounted on the frame 12 toward the rear 16 of the frame. In one embodiment of the system 10, the auxiliary person support platform assembly 60 is located behind the steering handle assembly 36 so that a person standing on the platform assembly 60 may stand upright and conveniently and safely operate the steering handle assembly. Further, the auxiliary person support platform assembly 60 is preferably positioned behind the rear wheels 28, 29 (or an axle connecting the rear wheels) which can minimize the wheel base of the stroller, especially when the stroller includes multiple seating positions for children, and provide a more balanced weight distribution when a user is standing on the platform assembly 60.

The auxiliary person support platform assembly 60 may comprise a platform 62 that is mounted on the frame 12. The platform 62 may be located toward the rear 16 of the frame 12. The platform 62 may be pivotable between a lowered, person supporting position 64 and a raised, stored position 66. The platform 62 may be oriented substantially horizontally in the lowered position 64 and the platform may be oriented substantially vertically in the raised position 66. The platform 62 may be formed, for example, by a plate member that has a substantially continuous surface, or by a perforated member that includes a plurality of holes in its surface.

The auxiliary person support platform assembly 60 may also include a platform auxiliary support wheel 68 that engages the ground surface for providing additional support to the platform 62 when the platform 62 is oriented in the lowered position 64. The platform auxiliary support wheel 68 may be positioned below the platform 62, and may be mounted on a bottom or underside of the platform in a manner such that the wheel engages the ground surface when the platform is pivoted downwardly into the lowered position 64. The platform auxiliary support wheel 68 may be pivotable or swivelable about a substantially vertical axis. Optionally, the support wheel 68 may be removable for storage when the platform is pivoted into the raised position 66.

Optionally, a seat assembly 70 may be provided for supporting a person on the platform 62 in a seated position. The seat assembly 70 may extend upwardly from the platform 62 when it is in the lowered position 64 so that a person seated on the seat assembly may place his or her feet onto the platform. The seat assembly 70 may be removably mounted on the platform 62 so that the seat assembly may be removed from the platform when use is not desired or when the platform is to be pivoted into the raised position 66. The seat assembly 70 may comprise a support member 72 that is removably mounted on the platform 62. The support member 72 may have a lower end 74 that is removably mounted on a socket 77 formed on the platform 62. The lower end 74 of the support member 72 may be releasably secured to the platform 62 by a securing pin 76, and an upper end 75 of the support member may be oriented above the platform 62. The seat assembly 70 may also comprise a seat member 78 that is mounted on the support member 72 at its upper end 75 such that the seat member is elevated above the platform 72.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A child transporting stroller system with an adult ride along function comprising:
    a frame having a front and a rear and lateral sides;
    a child supporting seat mounted on the frame;
    ground engaging means for engaging a ground surface and supporting the frame on the ground surface;
    moving means for rotating the ground engaging means for moving the frame over the ground surface;
    steering means for steering movement of the frame;
    an auxiliary person support platform assembly mounted on the frame, the auxiliary person support platform assembly including a platform pivotable between a lowered, person supporting position and a raised, stored position;
    wherein the steering means comprises a steering handle assembly mounted on the frame, the steering handle assembly being rotatable about a substantially vertical axis;
    wherein the steering handle assembly comprises:
        a steering upright mounted on the frame; and
        a steering cross bar mounted on the steering upright toward an upper end of the steering upright and extending laterally from the steering upright.

2. The system of claim 1 wherein the platform is oriented substantially horizontally in the lowered position and the platform is oriented substantially vertically in the raised position.

3. The system of claim 1 additionally comprising a platform auxiliary support wheel mounted on the platform for engaging the ground surface.

4. The system of claim 3 wherein the platform auxiliary support wheel is positioned below the platform.

5. The system of claim 3 wherein the platform auxiliary support wheel is pivotable about a substantially vertical axis.

6. The system of claim 1 additionally comprising a seat assembly for supporting a person on the platform in a seated position.

7. The system of claim 6 wherein the seat assembly is removably mounted on the platform.

8. The system of claim 6 wherein the seat assembly comprises:
    a support member removably mounted on the platform, the support member having a lower end mounted on a socket in the platform; and
    a seat member mounted on the support member such that the seat member is elevated above the platform.

9. The system of claim 1 wherein the ground engaging means includes rear wheel, and wherein the auxiliary person support platform assembly is located behind the rear wheels.

10. The system of claim 1 wherein the steering means comprises a steering handle assembly mounted on the frame, the steering handle assembly being rotatable about a substantially vertical axis.

11. The system of claim 1 wherein a length of the steering upright is adjustable such that a height of the steering cross member above the frame is adjustable.

12. The system of claim 1 wherein the ground engaging means comprises at least one front wheel mounted on the frame toward the front of the frame and a pair of rear wheels mounted on the frame toward the rear of the frame.

13. The system of claim 12 wherein the at least one front wheel or the pair of rear wheels is pivotable about a substantially vertical axis for permitting steering of movement of the frame.

14. The system of claim 12 wherein the moving means comprises:
   a motor supported on the frame;
   transfer means supported on the frame for transferring rotation from the motor to at least one of the front and rear wheels of the ground engaging means; and
   power means supported on the frame for powering the motor.

15. The system of claim 1 wherein the auxiliary person support platform assembly is free of any contact with the ground surface rearwardly of the pivot axis when the platform is in the lowered, person supporting position.

16. The system of claim 1 wherein the child supporting seat comprises a first child supporting seat, and additionally comprising a second child supporting set located behind the first child supporting seat and in front of the auxiliary person support platform assembly.

17. A child transporting stroller system with an adult ride along function comprising:
   a frame having a front and a rear and lateral sides;
   a child supporting seat mounted on the frame;
   ground engaging means for engaging a ground surface and supporting the frame on the ground surface;
   moving means for rotating the ground engaging means for moving the frame over the ground surface;
   steering means for steering movement of the frame;
   an auxiliary person support platform assembly mounted on the frame, the auxiliary person support platform assembly including a platform pivotable between a lowered, person supporting position and a raised, stored position;
   wherein the steering means comprises a steering handle assembly mounted on the frame, the steering handle assembly being rotatable about a substantially vertical axis;
   means for locking the steering handle assembly against rotation to prevent steering by the steering handle assembly and means for unlocking the steering upright for rotation to permit steering by the steering handle assembly.

18. The system of claim 17 wherein depression of the steering handle assembly into a depressed position toward the frame locks the steering upright against rotation and preventing steering of the steering handle assembly and wherein extension of the steering handle assembly from the depressed position into an extended position, unlocks the steering upright to permit rotation of the steering handle assembly.

19. A child transporting stroller system with an adult ride along function comprising:
   a frame having a front and a rear and lateral sides;
   a child supporting seat mounted on the frame;
   ground engaging means for engaging a ground surface and supporting the frame on the ground surface;
   moving means for rotating the ground engaging means for moving the frame over the ground surface;
   steering means for steering movement of the frame;
   an auxiliary person support platform assembly mounted on the frame, the auxiliary person support platform assembly including a platform pivotable about a pivot axis between a lowered, person supporting position and a raised, stored position;
   wherein the platform is cantilevered rearwardly of the pivot axis when the platform is in the lowered, person supporting position;
   wherein the platform is oriented substantially horizontally in the lowered position and the platform is oriented substantially vertically in the raised position;
   a platform auxiliary support wheel being mounted on the platform for engaging the ground surface;
   wherein the platform auxiliary support wheel is positioned below the platform;
   wherein the platform auxiliary support wheel is pivotable about a substantially vertical axis;
   a seat assembly for supporting a person on the platform in a seated position, the seat assembly being removably mounted on the platform;
   wherein the seat assembly comprises:
      a support member removably mounted on the platform, the support member having a lower end mounted on a socket in the platform; and
      a seat member mounted on the support member such that the seat member is elevated above the platform;
   wherein the ground engaging means includes rear wheel, and wherein the auxiliary person support platform assembly is located behind the rear wheels;
   wherein the steering means comprises a steering handle assembly mounted on the frame, the steering handle assembly being rotatable about a substantially vertical axis;
   wherein the steering handle assembly comprises:
      a steering upright mounted on the frame; and
      a steering cross bar mounted on the steering upright toward an upper end of the steering upright and extending laterally from the steering upright;
   wherein a length of the steering upright is adjustable such that a height of the steering cross member above the frame is adjustable;
   means for locking the steering handle assembly against rotation to prevent steering by the steering handle assembly and means for unlocking the steering upright for rotation to permit steering by the steering handle assembly;
   wherein depression of the steering handle assembly into a depressed position toward the frame locks the steering upright against rotation and preventing steering of the steering handle assembly and wherein extension of the steering handle assembly from the depressed position into an extended position unlocks the steering upright to permit rotation of the steering handle assembly;
   wherein the ground engaging means comprises at least one front wheel mounted on the frame toward the front of the frame and a pair of rear wheels mounted on the frame toward the rear of the frame;
   wherein the at least one front wheel or the pair of rear wheels is pivotable about a substantially vertical axis for permitting steering of movement of the frame, and
   wherein the moving means comprises:
      a motor supported on the frame;
      transfer means supported on the frame for transferring rotation from the motor to at least one of the front and rear wheels of the ground engaging means; and
      power means supported on the frame for powering the motor.

* * * * *